United States Patent
Torske et al.

(10) Patent No.: US 10,752,367 B2
(45) Date of Patent: Aug. 25, 2020

(54) SCAVENGED-POWER ICE-MANAGEMENT SYSTEM AND METHOD FOR AN AIRCRAFT

(71) Applicant: Bell Helicopter Textron Inc., Fort Worth, TX (US)

(72) Inventors: Nicholas Allen Torske, Lewisville, TX (US); Michael Dearman, Weatherford, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 276 days.

(21) Appl. No.: 15/969,217

(22) Filed: May 2, 2018

(65) Prior Publication Data
US 2019/0337628 A1 Nov. 7, 2019

(51) Int. Cl.
*B64D 15/12* (2006.01)
*B64D 15/16* (2006.01)
*B64C 29/00* (2006.01)

(52) U.S. Cl.
CPC .......... *B64D 15/12* (2013.01); *B64D 15/166* (2013.01); *B64C 29/0033* (2013.01)

(58) Field of Classification Search
CPC ...... B64D 15/12; B64D 15/166; B64D 15/16; B64C 29/0033; B64C 11/14
See application file for complete search history.

(56) References Cited

U.S. PATENT DOCUMENTS

| | | | | |
|---|---|---|---|---|
| 2,135,119 A | * | 11/1938 | Wood | B64D 15/16 244/134 A |
| 2,297,951 A | * | 10/1942 | Frank | B64D 15/16 244/134 A |
| 2,309,010 A | * | 1/1943 | Peter | B64D 15/02 244/134 R |
| 7,604,202 B2 | | 10/2009 | Froman et al. | |
| 8,517,313 B2 | * | 8/2013 | Gornik | B64D 15/20 244/134 F |
| 9,321,536 B2 | * | 4/2016 | Snir | B64D 15/14 |
| 9,701,406 B2 | * | 7/2017 | Robertson | B64C 29/0033 |
| 10,173,781 B2 | * | 1/2019 | Gornik | B64D 15/16 |
| 2013/0172143 A1 | * | 7/2013 | Gasparini | F16H 57/04 475/159 |
| 2017/0259911 A1 | | 9/2017 | Choi et al. | |

* cited by examiner

*Primary Examiner* — Brian M O'Hara
*Assistant Examiner* — Keith L Dixon
(74) *Attorney, Agent, or Firm* — Shackelford, Bowen, McKinley & Norton, LLP

(57) ABSTRACT

An ice-management method for an aircraft includes scavenging torque from a mast of the aircraft with a system that is configured to provide an ice-management capability. The method includes using the scavenged torque to impart a vibratory force to an arm of the system and imparting the vibratory force from the arm to an inner surface of a spinner of the aircraft via a contact of the arm.

15 Claims, 6 Drawing Sheets

SCAVENGED-POWER ICE-MANAGEMENT SYSTEM AND METHOD FOR AN AIRCRAFT

BACKGROUND

This section provides background information to facilitate a better understanding of the various aspects of the disclosure. It should be understood that the statements in this section of this document are to be read in this light, and not as admissions of prior art.

Aircraft sometimes encounter conditions where ice may form on various surfaces of the aircraft. For example, ice may form on components of the aircraft including the wing, fuselage, rotor blades, and spinners of the aircraft. Formation of ice on components of the aircraft is undesirable as it adds weight, can create imbalances, and can alter functionality or performance of the aircraft.

SUMMARY

An aircraft-based ice-management system includes a base configured to attach to a mast of the aircraft, a movable mount movably coupled to the base, and an arm with a first end configured to attach to the movable mount and a second end comprising a contact configured to contact an inner surface of a spinner of the aircraft.

An aircraft-based ice-management system includes a bearing with an outer race and an inner race. The outer race is configured to be attached to a mast of the aircraft. The system also includes a channel adjacent to the outer race. The channel includes a feature disposed therein that is configured to impart a force to an inner surface of the spinner. The system also includes an arm with a first end movably attached to the channel and a second end comprising a contact configured to contact the inner surface of the spinner to apply a vibratory force thereto.

An ice-management method for an aircraft includes scavenging torque from a mast of the aircraft with an ice-management system. The ice-management method includes using the scavenged torque to impart a vibratory force to an arm of the ice-management system and imparting the vibratory force from the arm to an inner surface of the spinner via a contact of the arm.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
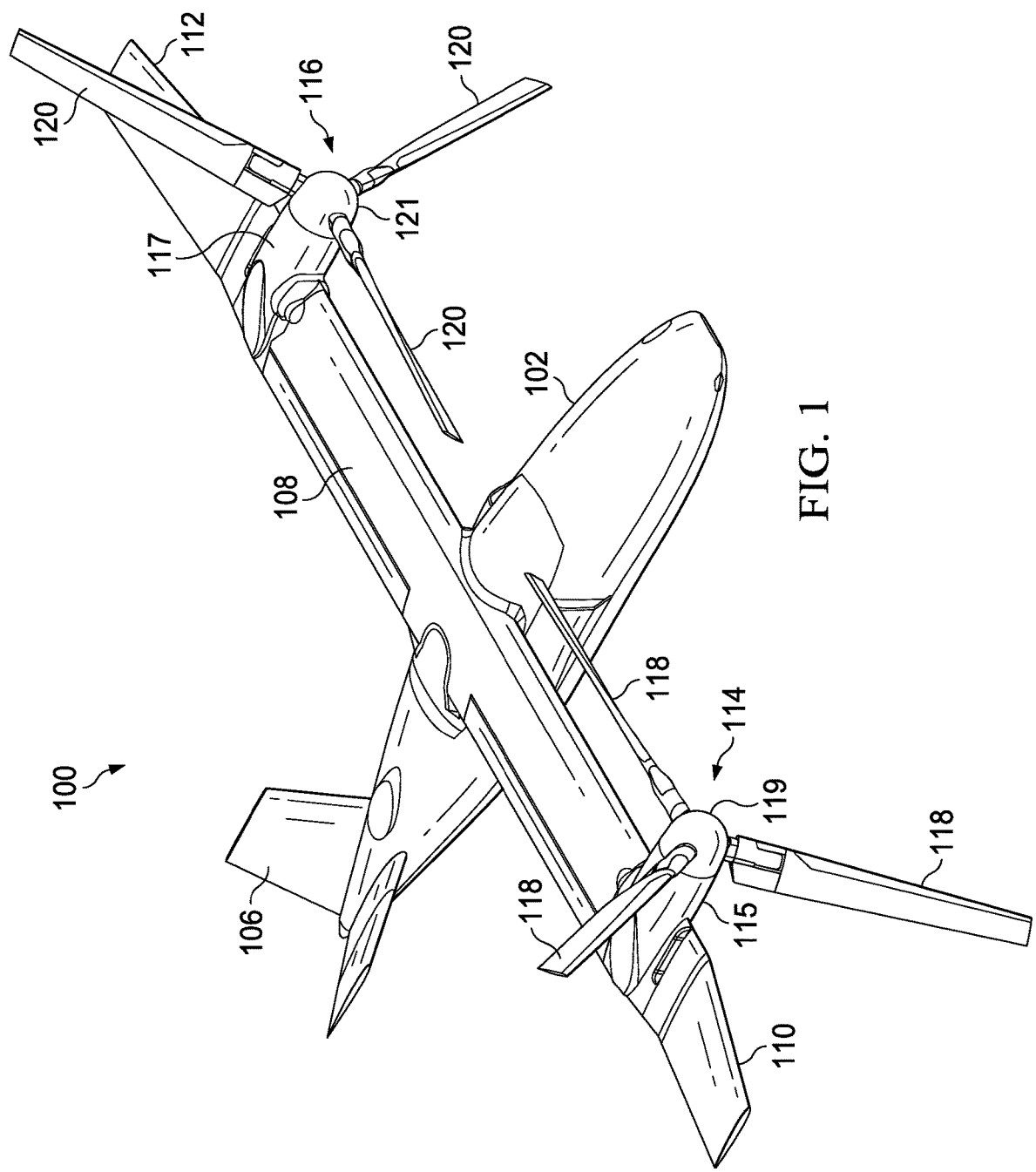
FIG. 1 is a perspective view of an exemplary tiltrotor aircraft configured in a flight ready position according to aspects of the disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

Referring to FIG. 1, an exemplary tiltrotor aircraft 100 is shown. The tiltrotor aircraft 100 includes a fuselage 102, a tail member 106, a wing 108, a wing tip 110, a wing tip 112, a rotor system 114, and a rotor system 116. The rotor system 114 is housed within a nacelle 115 located on an end portion of the wing 108 that is proximal the wing tip 110. The rotor system 116 is housed within a nacelle 117 located on an opposite end portion of the wing 108 that is proximal the wing tip 112. The wing tip 110 is pivotable at a location on the wing 108 that is outboard the nacelle 115. The wing tip 112 is pivotable at a location on the wing 108 that is outboard the nacelle 117. The nacelles 115, 117 are pivotable between a helicopter mode where the rotor systems 114, 116 are generally vertical and an airplane mode where the rotor systems 114, 116 are generally horizontal as shown in FIG. 1. The nacelles 115, 117 are substantially symmetric relative to each other about the fuselage 102.

The rotor system 114 includes a plurality of foldable rotor blades 118 and the rotor system 116 includes a plurality of foldable rotor blades 120. Each rotor system 114, 116 includes a nosecone or spinner 119, 121, respectively. The rotor blades 118 and 120 may rotate in opposite directions to cancel torque associated with the operation of each rotor system 114, 116. An angle of the pivotable nacelles 115 and 117 relative to the wing 108, as well as the pitch of rotor blades 118, 120, can be adjusted in order to selectively control direction, thrust, and lift of tiltrotor aircraft 100. The rotor systems 114, 116 are illustrated in the context of the tiltrotor aircraft 100; however, a singular rotor system with foldable rotor blades can be implemented on other non-tilting rotor and helicopter rotor systems. It should also be appreciated that teachings relative to the tiltrotor aircraft 100 may apply to other aircraft such as non-tiltrotor aircraft (e.g., other airplanes and helicopters) and unmanned aircraft.

The fuselage 102 represents a body of the tiltrotor aircraft 100 and may be coupled to the rotor systems 114, 116 such that the rotor systems 114, 116, along with the rotor blades 118, 120, may move tiltrotor aircraft 100 through the air. Landing gear supports the tiltrotor aircraft 100 when the tiltrotor aircraft 100 is landing and when the tiltrotor aircraft 100 is at rest on the ground. FIG. 1 represents the tiltrotor aircraft 100 in flight ready position in the airplane mode.

Referring to tiltrotor aircraft in general, each rotor system includes a mast driven by a power source (e.g., an engine or motor). Each rotor system also includes a yoke connected to the mast, with rotor blades indirectly connected to the yoke with bearings. The bearings may be, for example, elastomeric bearings constructed from a rubber type material that absorb vibration. The bearings may include inboard bearings connecting a cuff or grip of a rotor blade to the yoke proximate the mast and outboard bearings connecting the rotor blade to an outboard end of the yoke. The cuff or grip may be separate from the rotor blade or may be integrally formed with the rotor blade. Other combinations of inboard and outboard bearings with or without cuffs or grips are possible as well as the removal of one or the other of the bearings. The bearings accommodate forces acting on the rotor blades allowing each rotor blade to flex with respect to the yoke/mast and other rotor blades. The weight of the rotor blades and the lift of rotor blades generated by action of the rotor blades may result in transverse forces on the yoke and other components. Examples of transverse forces may include forces resulting from flapping and coning of the rotor blades. Flapping generally refers to the up-and-down movement of a rotor hub positioned at a right angle to the plane of rotation. Coning generally refers to the upward flexing of a rotor blade due to lift forces acting on the rotor blade. The rotor blades may be subject to other forces, such as axial, lead/lag, and feathering forces. Axial forces generally refer to the centrifugal force on the rotor blades during rotation of the rotor blades. Lead and lag forces generally refer to forces resulting from the horizontal movement of the rotor blades about a vertical pin occurring if, for example, the rotor blades do not rotate at the same rate as the yoke. Feathering forces generally refer to forces resulting from twisting motions that cause a rotor blade to change pitch. The power source, mast, and yoke are components for transmitting torque. The power source may include a variety of components including an engine, a transmission, and differentials. In operation, the mast receives torque from the power source and rotates the yoke. Rotation of the yoke causes the rotor blades to rotate with the mast and yoke.

In cold ground conditions and certain flight conditions, condensation can form on various components of the tiltrotor aircraft 100. If the ambient temperature is below freezing, the condensation can turn to ice. Components like the fuselage 102 and the wing 108 can include electrical heating elements or pneumatics that are used to prevent ice from forming on the fuselage 102 and the wing 108 or to melt ice that has already formed thereon. In some embodiments, the spinners 119, 121 can include electrical heating elements. For example, the spinners 119, 121 can include an electric mat that lines an inside of the spinners 119, 121. The electric mat provides heat to the spinner 119, 121 to prevent ice from building up or to remove ice that has already built up. Prevention of ice from forming is sometimes referred to as anti-ice and removing already-formed ice is sometimes referred to as de-ice. The electric mat design is effective, but adds complexity, weight, and stiffness to the design of the spinners 119, 121. In order to power the electric mat, which is spinning with the spinners 119, 121, electrical power must be provided through the mast. This is typically accomplished by routing wiring through an inner bore of the mast and using a slip-ring connection to transfer power from the wiring, which is stationary inside the rotating mast, to the electric mat, which is secured to the spinner that rotates with the mast. Space inside the mast is limited and other components and wiring need to be routed through the mast as well.

Presented herein are alternative ice-management systems and methods that provide anti-ice and de-ice capabilities without using electrical power. Instead of electrical power, the ice-management systems and methods disclosed herein scavenge torque from the mast to induce a vibratory force upon the spinners to provide ice-management that includes anti-ice and de-ice capabilities. Scavenging torque from the mast eliminates the ice-management system's need for electrical power, which eliminates the need for electrical wiring to pass through the mast, freeing up additional space within the mast for other components.

Figure 2:
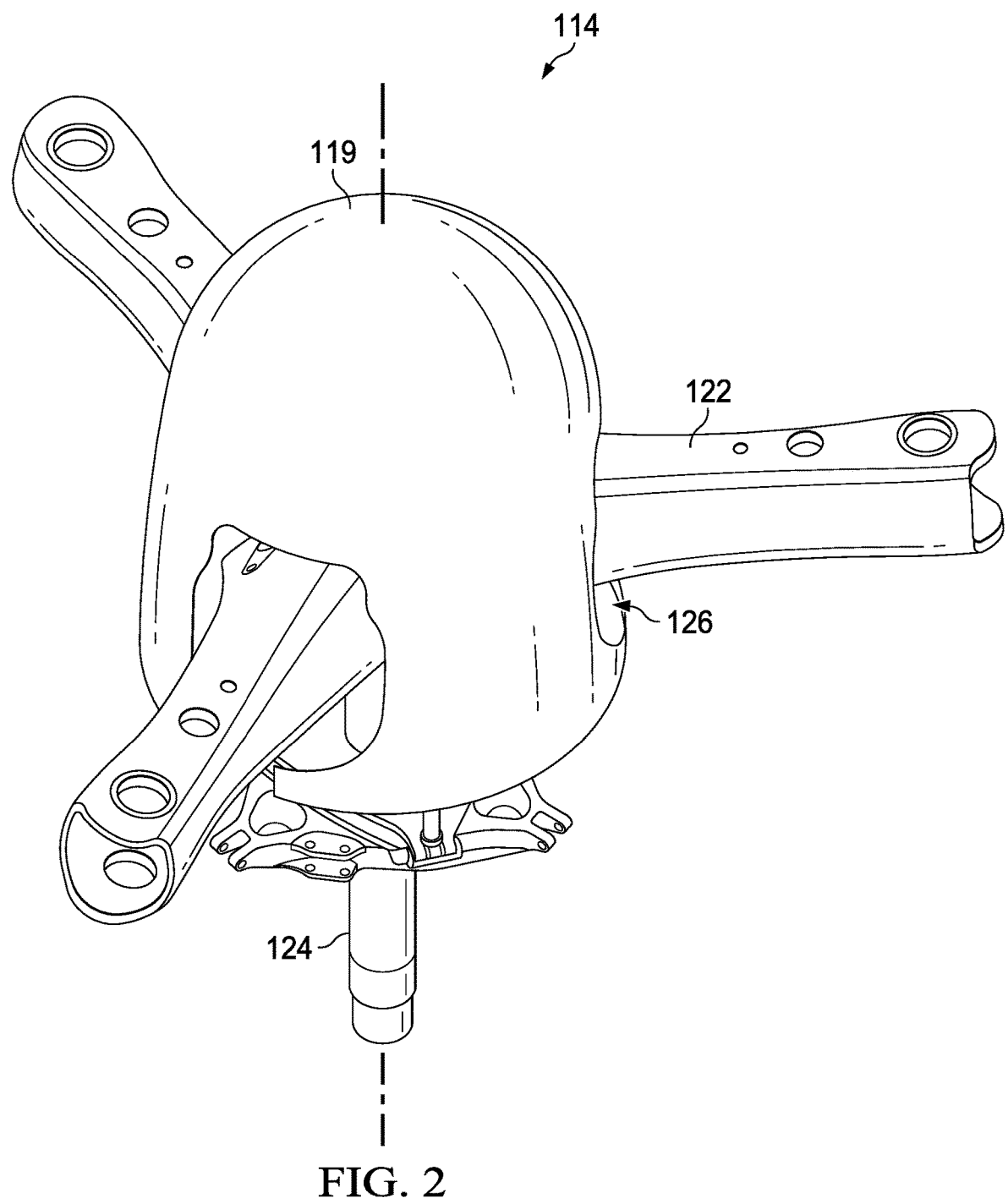
FIG. 2 is an isometric view of a portion of a rotor system according to aspects of the disclosure.

Referring now to FIG. 2, an isometric view of a portion of the rotor system 114 is shown. In the interest of clarity, the rotor system 114 is described herein with the understanding that the rotor system 116 includes similar components. The rotor system 114 includes a grip and yoke assembly 122 for securing rotor blades 118 (shown in FIG. 1) to a mast 124. Holes 126 are formed in the spinner 119 to allow portions of the yoke assembly 122 to protrude through the spinner 119 for attachment of rotor blades 118. The mast 124 is connected to an output of the engine (not shown) for transfer of torque from the engine to mast 124.

Figure 3:
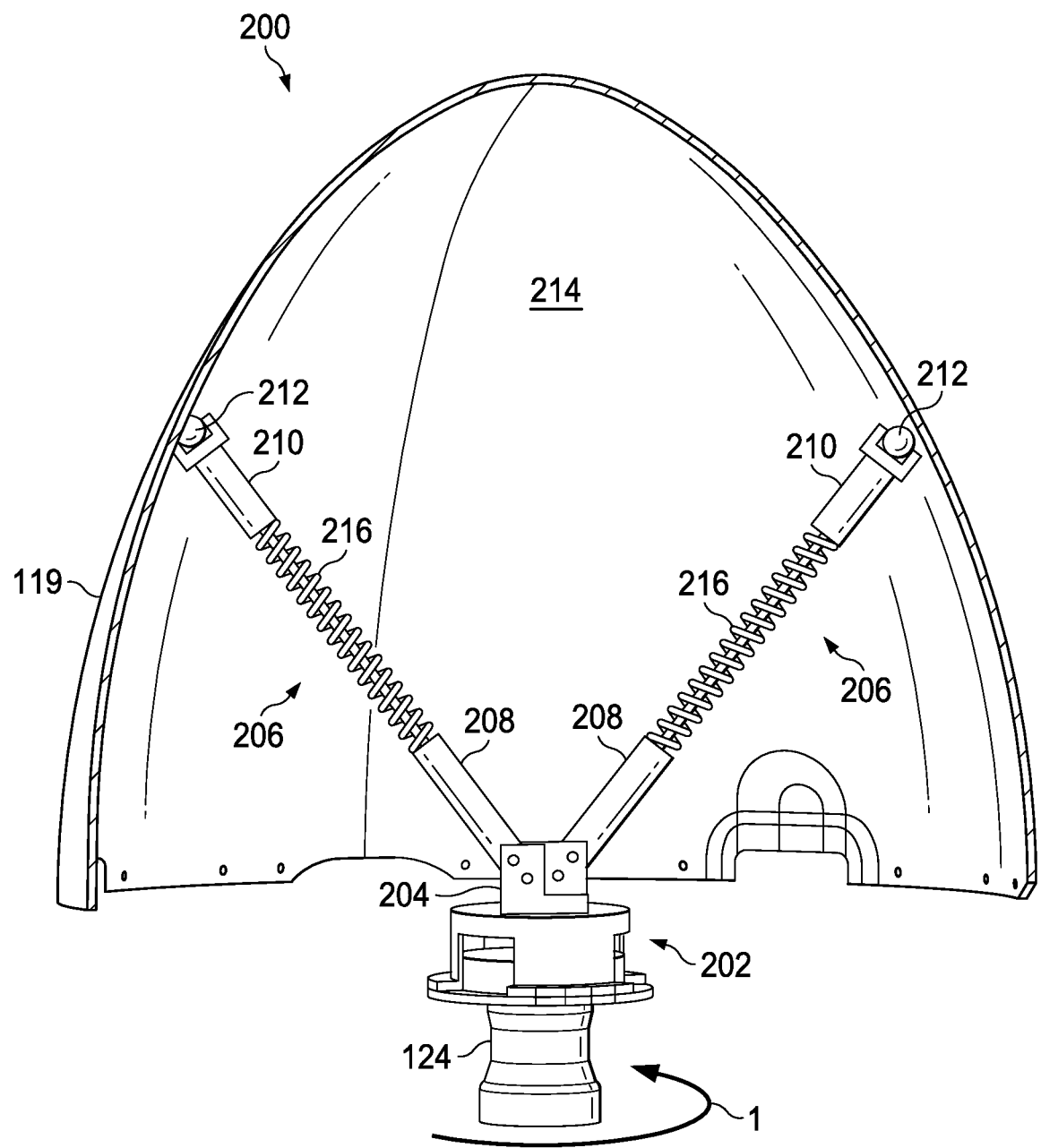
FIG. 3 is a sectioned view of a spinner including an exemplary ice-management system according to aspects of the disclosure.

Referring now to FIG. 3, a sectioned view of the spinner 119 according to aspects of the disclosure is shown. Various components within the spinner 119 have been hidden to more clearly show an ice-management system 200 within the spinner 119. For example, the yoke assembly 122 and the rotor blades 118 are hidden from view. The system 200 includes a base 202 that attaches to the mast 124. As the mast 124 rotates, the base 202 also rotates, scavenging torque from the engine. Because the base 202 is rotated by the mast 124, the system 200 does not need electrical power to operate. In an exemplary embodiment, the mast 124 rotates in the direction of arrow 1. A movable mount 204 is movably coupled to the base 202 such that it is free to move in response to forces that are exerted upon the movable mount 204. Operation of the movable mount 204 is discussed in more detail below.

Arms 206 are attached to the movable mount 204 and contact the spinner 119. When the mast 124 spins, the movable mount 204 moves about the base 202 in such a way as to impart vibratory forces to the spinner 119 to prevent or break up ice on the spinner 119. First ends 208 of the arms 206 are secured to the movable mount 204. Second ends 210 of the arms 206 comprise contacts 212 that are positioned to contact an inner surface 214 of the spinner 119. The first ends 208 are fixedly secured to the movable mount 204 so that an orientation of the arms 206 relative to the movable mount 204 is fixed. As shown in FIG. 3, the arms 206 are fixed to the movable mount 204 so that the contacts 212 contact the inner surface 214 at roughly a midpoint of a height of the spinner 119. In some embodiments, the spinner 119 tends to be more flexible near the midpoint of the height of the spinner 119. In other embodiments, the arms 206 may be fixed to the movable mount 204 so that the contacts 212 contact the inner surface 214 at higher or lower points. In an exemplary embodiment, portions of the contacts 212 that contact the inner surface 214 are formed from a material that allows the contacts 212 to easily slide across the inner surface 214. Exemplary materials include but are not limited to a build-up of composite, metallic or rubber. It can also be a complex assembly forming a sliding track or a hard-mounted bearing assembly In the exemplary embodiment of FIG. 3, the arms 206 include springs 216 that form a portion of a length of the arms 206. The springs 216 bias the contacts 212 against the inner surface 214 and also act as dampers to limit a magnitude of vibrations that the arms 206 can impart to the spinner 119. In other embodiments, the springs 216 could be replaced with other types of dampers such as shocks, dashpots, elastomeric springs, and the like. In some embodiments, the arms 206 do not include a damper disposed along the length of the arms 206. Instead, the arms 206 are made of a material that acts as a damper, such as an elastomeric material. In such embodiments, dimensions of the arms 206 are configured to ensure contact against the inner surface 214 (e.g., a length that causes the contacts 212 to contact the inner surface and a diameter to provide a rigidity that causes the contacts 212 to impart a vibratory force upon the spinner 119).

As shown in FIG. 3, the system 200 includes two arms 206. In other embodiments, the system 200 may include a single arm 206 or more than two arms 206. In some embodiments including more than one arm 206, the arms 206 are equally spaced from one another. In some embodiments including more than one arm 206, the arms are unequally spaced from one another.

Figure 4:
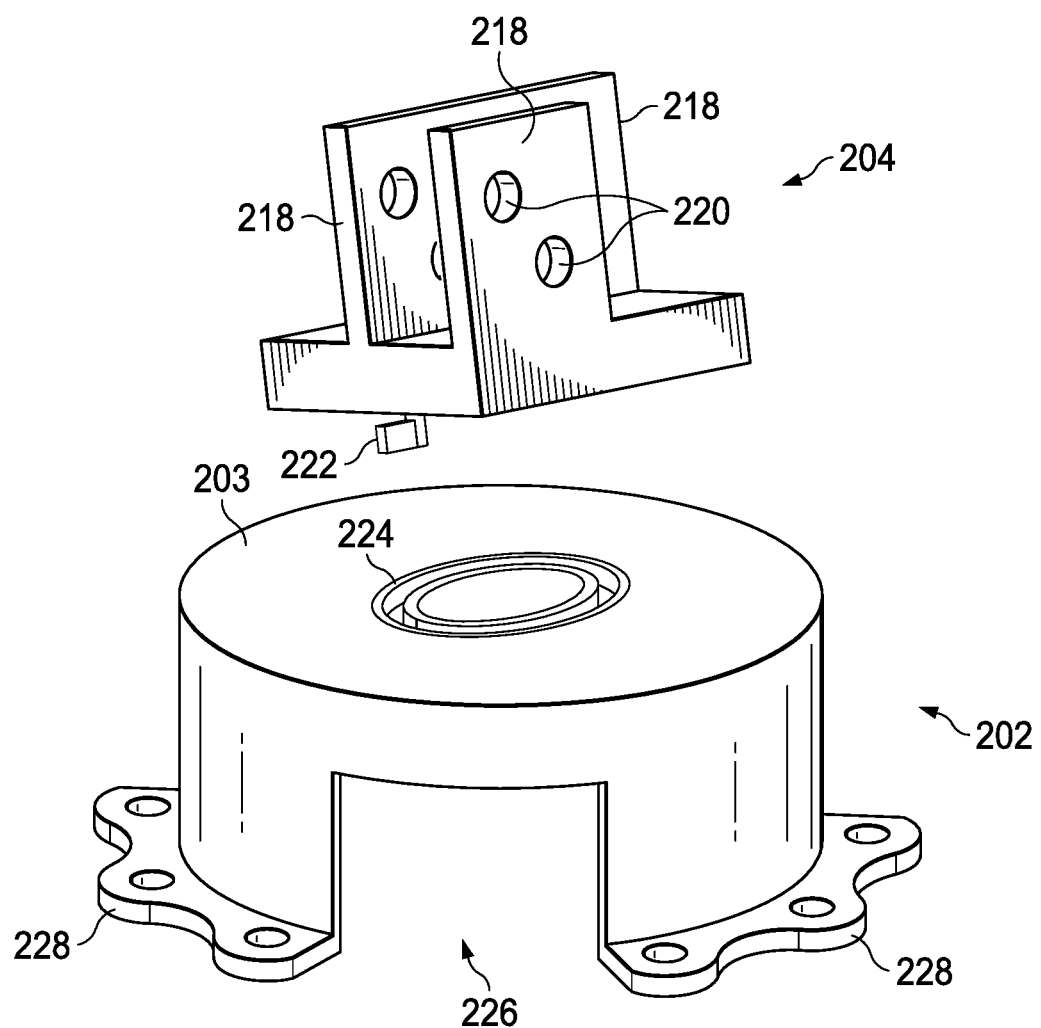
FIG. 4 is an exploded view of components of the exemplary ice-management system of FIG. 3.

Referring now to FIG. 4, a partial exploded assembly of the system 200 is shown. The movable mount 204 includes mounting plates 218 with holes 220 that provide mounting points for the first ends 208 of the arms 206. In the exemplary embodiment shown in FIG. 4, each mounting plate 218 includes holes 220 that are used to hold an arm 206 in a fixed position relative to the movable mount 204. Fasteners such as pins or bolts may be used in conjunction with the holes 220 to secure the arms 206 to the movable mount 204. In other embodiments, the arms 206 may be secured to the movable mount 204 in other ways. For example, the arms 206 may be welded, riveted, glued, and the like.

The movable mount 204 includes a retention device or foot 222 that fits into a track 224 of the base 202. The foot is for retention should the 218 base experience high dynamic modes with large motions in the mast axis. Other retention methods such as a flanged bushing could be used. The track 224 is located on a face 203 that is oriented generally perpendicular to an axis of the mast 124. The foot 222 is dimensioned so that it can be inserted into the track 224 when properly oriented. For example, the foot 222 has a length that is greater than a width. With the length of the foot oriented in-line with the track 224, the foot may be lowered into the track 224. Once in the track 224, the foot 222 is rotated so that the length of the foot 222 is oriented across a width of the track 224. With the foot 222 located in the track 224, the foot 222 restrains movement of the movable mount 204 in an axial direction relative to the base 202 but does not restrain transverse movement of the movable mount 204. Thus, during operation of the rotor system 114, the movable mount 204 is permitted to move freely about the track 224 as the mast 124 rotates. In other embodiments, the track 224 could be disposed on the movable mount 204 and the foot 222 could be disposed on the base 202.

In an exemplary embodiment, the track 224 comprises an elliptical shape. As the base 202 is rotated by the mast 124, mass of the movable mount 204 is acted upon by centrifugal force, which causes the movable mount 204 to move around the track 224. As the movable mount 204 moves about the track 224, the arms 206 rotate around inside the spinner 119 and the contacts 212 of the arms 206 are pressed against the inner surface 214 of the spinner 119 with varying amounts of force. The varying amounts of force exerted by the contacts 212 impart a vibratory force on the inner surface 214. The vibratory force is carried through the spinner 119 and acts to break apart ice that has formed on an exterior surface of the spinner 119 and/or prevent ice from forming on the exterior surface of the spinner 119. An eccentricity of the ellipse affects the magnitude of the force induced upon the arms 206. The greater the eccentricity of the ellipse, the greater the resulting force. In some embodiments, the track 224 is in the shape of a circle. In another embodiment the shape comprises complex geometry that tunes the response to a desired frequency or action to break or prevent ice formation. For example, the complex geometry may approximate a circle or ellipse with a wavy perimeter. In various embodiments, a center of the track 224 is coaxial with a central axis of the mast 124. In various other embodiments, the center of the track 224 is not aligned with the central axis of the mast 124. A location of the foot 222 relative to a center of mass of the movable mount 204 also affects the magnitude of the force induced upon the arms 206. The farther apart the foot 222 is positioned from the center of mass of the movable mount 204, the greater the resulting force.

The base 202 comprises windows 226 disposed between flanges 228. The windows 226 provide space for wiring or other components to pass from the mast 124 into the spinner 119. The flanges 228 couple to the mast 124 to join the mast 124 and the base 202 together. In other embodiments, the base 202 may be joined to the mast 124 in other ways. In some embodiments, the base 202 may be formed as a part of the mast 124 such that the base 202 is integral with the mast 124.

Figure 5:
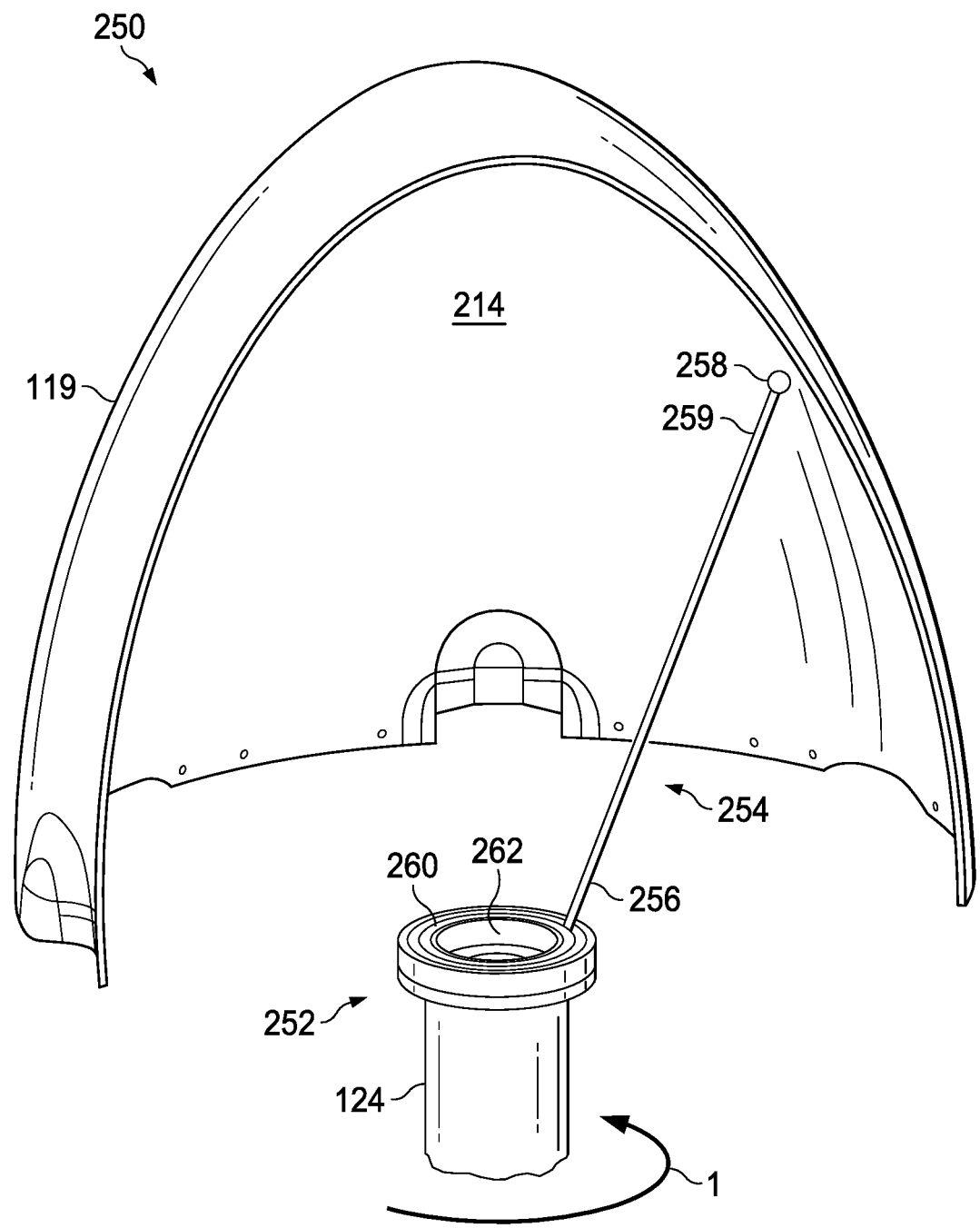
FIG. 5 is a sectioned view of a spinner including an exemplary ice-management system according to aspects of the disclosure.

Referring now to FIG. 5, a sectioned view of the spinner 119 according to aspects of the disclosure is shown. Various components within the spinner 119 have been hidden to more clearly show an ice-management system 250 within the spinner 119. For example, the yoke assembly 122 and the rotor blades 118 are hidden from view. The system 250 includes a bearing 252 that is attached to the mast 124 and an arm 254 that extends from the bearing 252 to the inner surface 214. The arm 254 couples to the bearing 252 at a first end 256 and contacts the inner surface 214 with a contact 258 disposed at a second end 259. When the mast 124 rotates, an outer race 260 of the bearing 252 that is attached to the mast 124 also rotates, scavenging torque from the engine. Because the outer race 260 rotates with the mast 124, the system 250 does not need electrical power to operate. Rotation of the outer race 260 imparts rotation to the arm 254, which in turn imparts vibratory forces from the contact 258 to the spinner 119 to prevent or break up ice on the spinner 119. Operation of the system 250 is discussed in more detail below.

The bearing 252 includes the outer race 260 and an inner race 262. In an exemplary embodiment, the bearing 252 includes a channel 264 adjacent to the outer race 260 that is configured to retain the first end 256 of the arm 254. In some embodiments, the channel 264 is integrally formed into the outer race 260. In some embodiments, the channel 264 is formed into a separate ring that is coupled to the outer race 260 (e.g., by press fitting, welding, and the like). The first end 256 comprises dimensions such that a cross-section of the first end 256 is larger than an opening of the channel 264, which prevents the first end 256 from coming out of the channel 264. While the first end 256 is not free to come out of the channel 264, the first end 256 is free to move along the channel 264. As the mast 124 rotates, the first end 256 is slung around the channel 264.

Figure 6:
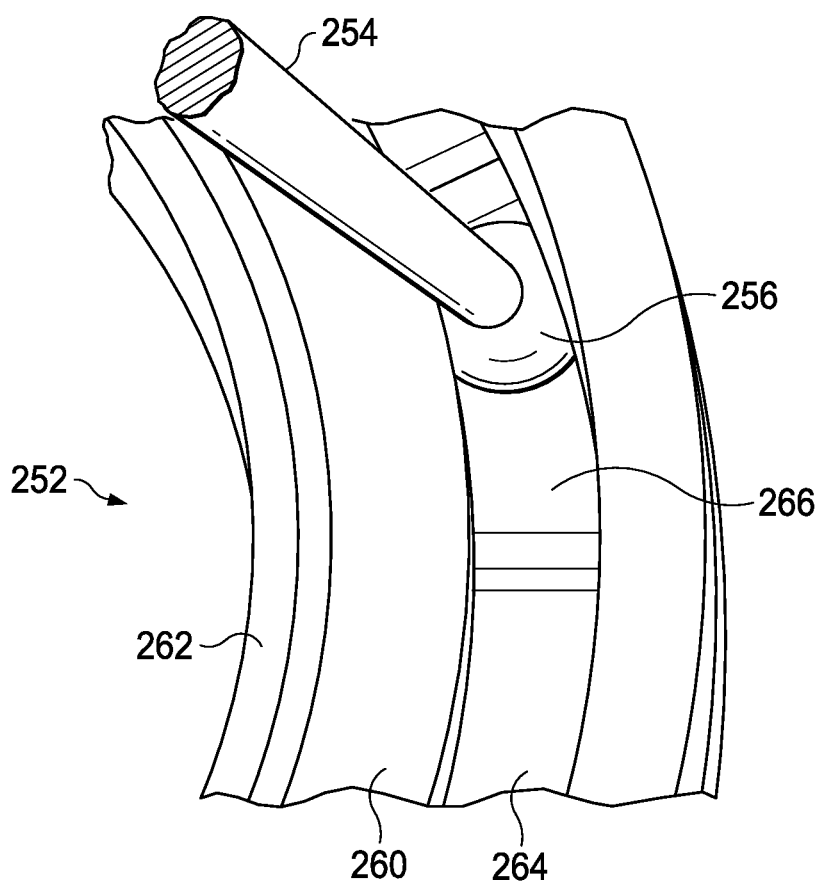
FIG. 6 is a top view of a bearing assembly of the system of FIG. 4 according to aspects of the disclosure.

Referring now to FIG. 6, a close-up top view of the bearing 252 is shown. The channel 264 includes a feature 266 that imparts a force upon the arm 254 as the arm 254 moves past the feature 266. As shown in FIG. 6, the feature 266 is a depression in the channel 264. As the first end 256 passes the feature 266, an impact force or jolt is imparted to the first end 256. The impact force is transferred through the arm 254 to the contact 258, and the contact 258 transfers the force into the spinner 119. As the arm 254 continues to around the channel 264, a vibratory force is applied to the spinner 119 to break up ice that has formed on the spinner 119 and/or prevent ice from forming on the spinner 119. A frequency of the vibratory force can be tuned by altering the feature 266. For example, the channel 264 may include multiple features 266 disposed about the channel 264. A number of and separation between features 266 alters the frequency of the vibratory force. In other embodiments, the feature 266 could be a series of waves, undulations, ribs, bumps, and the like that impart a force to the first end 256 as the first end 256 travels over the feature 266. As illustrated in FIG. 6, the feature 266 is disposed on a bottom of the channel 264. In other embodiments, the feature 266 could be disposed on an inner or outer wall of the channel 264.

Figure 7:
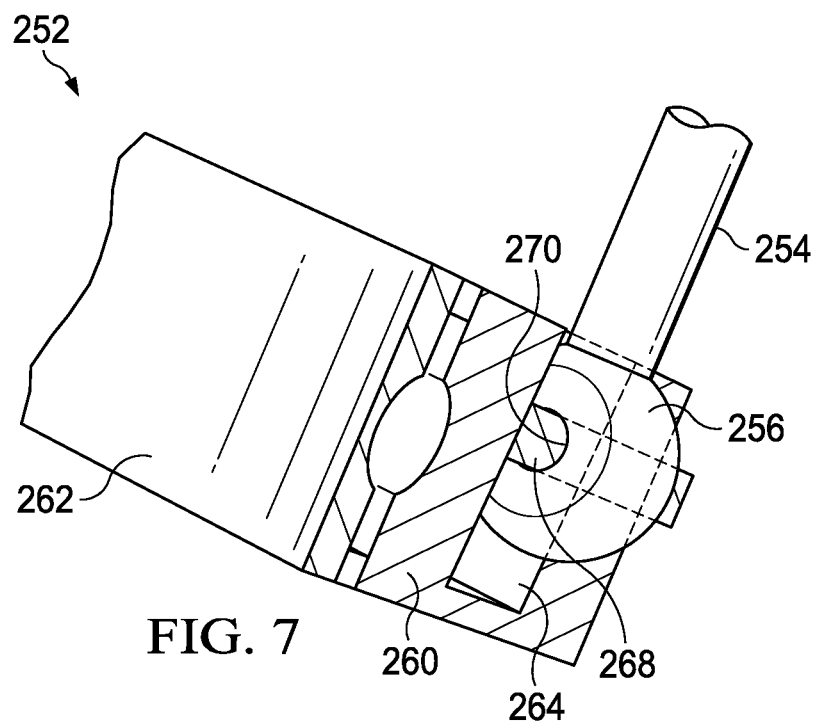
FIG. 7 is a sectioned view of the bearing assembly of FIG. 4 comprising a lockout pin.

Referring now to FIG. 7, a sectioned close-up view of an exemplary embodiment of the bearing 252 is shown. In the embodiment of FIG. 7, the system 250 includes a clutch mechanism that allows the system 250 to be engaged and disengaged as desired. In an exemplary embodiment, the clutch mechanism includes a lockout pin 268 that may be actuated by an actuator. For example, an actuator may extend or retract the lockout pin 268. The lockout pin 268 is shown in FIG. 7 as engaged with a hole 270 of the first end 256 of the arm 254. With the lockout pin 268 engaged, the arm 254 is locked in place in the channel 264 and does not impart vibratory forces to the spinner 119 because the arm 254 is locked into rotating with the spinner 119, thus the first end 256 no longer passes over the feature 266. The lockout pin 268 may be optionally disengaged or engaged as desired to activate or deactivate the system 250, respectively. For example, if no de-icing is needed (e.g., ambient temperatures above freezing), the lockout pin 268 is engaged with the hole 270. If conditions are such that de-icing is needed, the lockout pin 268 can be disengaged by an actuator connected to the lockout pin 268. In some embodiments, the clutch mechanism includes a friction brake or shoe that can be pushed into the channel 264 to slow or impede the movement of the arm 254. When engaged, the friction brake contacts the first end 256 to slow or stop movement of the first end 256. The friction brake can be used to enable or disable the ice-management system 250. In some embodiments, once the arm 254 has been stopped by the friction brake, the lockout pin 268 may engage the hole 270 to further lock the arm 254 in place.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially" and "generally" may be substituted with "within [a percentage] of" what is specified, where the percentage may include 0.1, 1, and 5 percent as may be recognized by a person skilled in the art.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. An aircraft-based ice-management system, the system comprising:
    a base configured to attach to a mast of an aircraft;
    a movable mount movably coupled to the base; and
    an arm with a first end configured to attach to the movable mount and a second end comprising a contact configured to contact an inner surface of a spinner of the aircraft;
    wherein the base comprises a track disposed on a face of the base; and
    wherein the movable mount comprises a foot configured to fit within the track and movably secure the movable mount to the base.

2. The system of claim 1, wherein the track has an elliptical shape.

3. The system of claim 1, wherein the track has a circular shape.

4. The system of claim 1, wherein the track has a center that is coaxial with a central axis of the mast.

5. The system of claim 1, wherein the arm comprises a damper disposed along a length of the arm.

6. The system of claim 5, wherein the damper comprises a spring.

7. The system of claim 1, wherein the arm is configured to contact the inner surface at midpoint of a height of the spinner.

8. The system of claim 1, further comprising a second arm with a first end configured to attach to the movable mount and a second end comprising a contact configured to contact the inner surface of the spinner.

9. An aircraft-based ice-management system, the system comprising:
    a bearing with an outer race and an inner race, the outer race configured to attach to a mast of an aircraft;
    a channel adjacent to the outer race and comprising a feature disposed within the channel, the feature configured to impart a force to an inner surface of a spinner; and
    an arm with a first end movably attached to the channel and a second end comprising a contact configured to contact the inner surface of the spinner to apply a vibratory force thereto.

10. The system of claim 9, wherein the feature comprises a depression configured impart a force to the first end.

11. The system of claim 9, further comprising:
    a lockout pin configured to engage a hole formed through the first end of the arm; and
    wherein the system is disabled when the lockout pin is engaged with the hole and the system is enabled when the lockout pin is disengaged from the hole.

12. The system of claim 11, further comprising a clutch and an actuator that is coupled to the lockout pin and configured to engage and disengage the lockout pin with the hole.

13. The system of claim 9, wherein the arm is configured to contact the inner surface at midpoint of a height of the spinner.

14. An ice-management method for an aircraft, the method comprising:

scavenging torque from a mast of the aircraft with an ice-management system;
using the scavenged torque to impart a vibratory force to an arm of the ice-management system;
imparting the vibratory force from the arm to an inner surface of a spinner via a contact of the arm;
wherein the ice-management system comprises:
  a bearing with an outer race and an inner race, the outer race configured to be attached to the mast of the aircraft;
  a channel adjacent to the outer race and comprising a feature disposed within the channel, the feature being configured to impart a force to the inner surface of the spinner; and
  an arm with a first end movably attached to the channel and a second end comprising the contact configured to contact the inner surface of the spinner to apply the vibratory force thereto.

15. The method of claim 14, wherein the feature comprises a depression.

\* \* \* \* \*